2 Sheets—Sheet 1.

F. W. CHILD.

TABULAR CALCULATOR.

No. 10,592. Reissued May 5, 1885.

Attest:

Geo. H. Botts.

J. A. Hoey

Inventor:

Frederick W. Child by Munson & Philipp

Atty's

F. W. CHILD.

TABULAR CALCULATOR.

No. 10,592. Reissued May 5, 1885.

Witnesses:

Geo. H. Botts

J. A. Hoover

Inventor:

Frederick W. Child by Munson & Philipp

Atty's.

THE ECKERT LITHOGRAPHING CO., WASHINGTON, D. C.

UNITED STATES PATENT OFFICE.

FREDERICK W. CHILD, OF GREENWICH, CONNECTICUT.

TABULAR CALCULATOR.

SPECIFICATION forming part of Reissued Letters Patent No. 10,592, dated May 5, 1885.

Original No. 313,655, dated March 10, 1885. Application for reissue filed April 11, 1885.

*To all whom it may concern:*

Be it known that I, FREDERICK W. CHILD, a citizen of the United States, residing in the city of Greenwich, county of Fairfield, and State of Connecticut, have invented certain new and useful Improvements in Apparatus for Displaying Tables, fully described and represented in the following specification and the accompanying drawings forming a part of the same.

The present invention relates to an apparatus which is designed and adapted for use in displaying all classes of tables consisting of three factors, the said apparatus being especially adapted for the use of pay-masters, book-keepers, salesmen, and others who, from the nature of their employment, are obliged to make a great number of calculations involving the process of multiplication. Where a large number of such calculations have to be made, and particularly where, as is frequently the case, one of the factors is a mixed number, a large amount of time is consumed and an amount of mental labor required which it is highly desirable to avoid. In addition to this, when such calculations are made by the ordinary methods errors are liable to occur, which cause much annoyance and require considerable time to correct.

It is the object of the present invention to provide a simple and compact apparatus by which all classes of tables involving three factors can be readily and quickly displayed, and particularly by which calculations involving the process of multiplication can be made with great speed and absolute accuracy and without mental effort.

The construction of the apparatus embodying the invention, and the manner of using the same, will now be particularly described and explained in connection with the accompanying drawings, in which—

Figure 1:
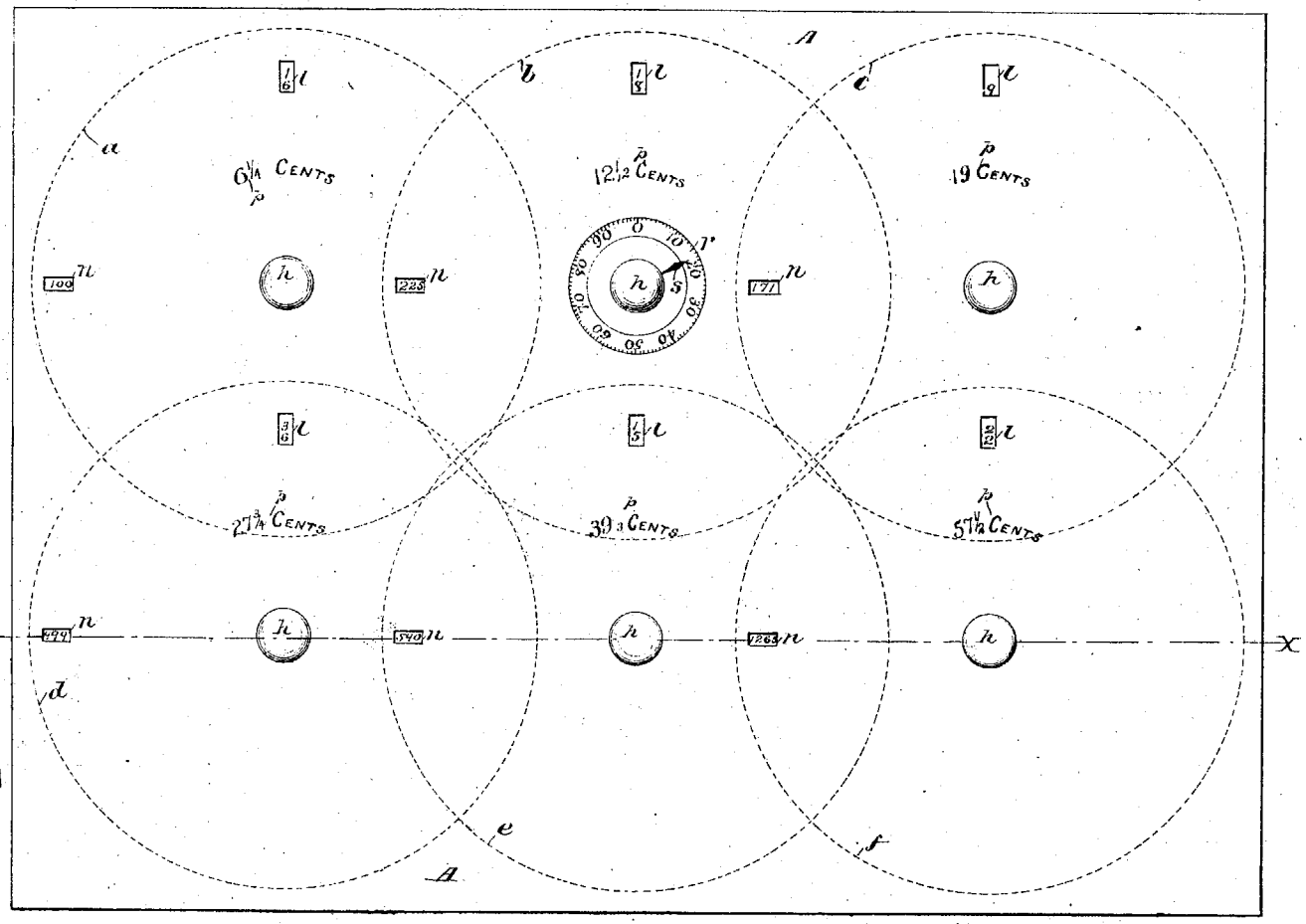
Figure 2:
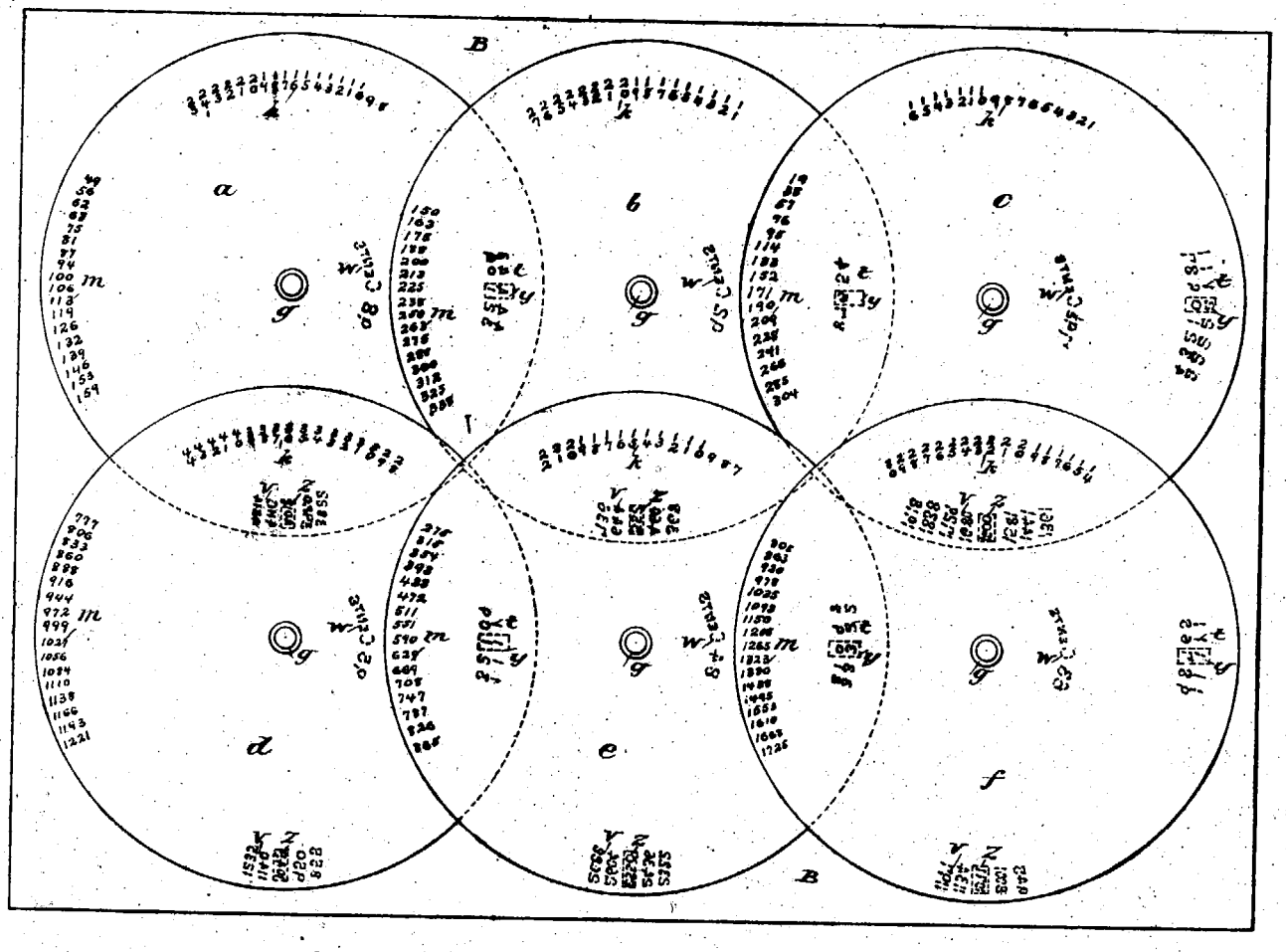
Figure 3:
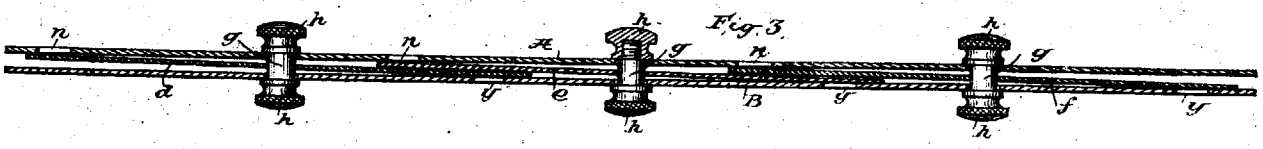

Figure 1 is a plan view of the apparatus. Fig. 2 is a similar view, the top plate of cover being removed so as to expose the interior apparatus; and Fig. 3 is a cross-section taken upon the line *x x* of Figs. 1 and 2.

Referring to said figures, it is to be understood that the apparatus, as therein shown, is composed of two face plates or sheets, A B, of pasteboard or other suitable material, between which are arranged a number of plain disks, *a b c d e f*, which are also composed of pasteboard or other similar material, and are made fast at their centers to studs *g*, which pass through the plates A B, and are provided upon one or both ends with knobs *h*, which serve to hold the plates A B together, and also as a means for revolving the disks *a b c*, &c.

When the apparatus is to be used for making calculations involving only multiplication, each of the disks *a b c*, &c., will be provided around the edge of its upper face with two rows of figures, *k m*, the row *k* containing the numbers from 1 up to 50, or 100, or more, according to the capacity which it is desired to give to the apparatus, and the row *m* the numbers representing the products of the numbers in the row *k* when multiplied by an arbitrarily-selected number representing the unit upon which the calculations to be made upon that particular disk are based. The plate A is provided with two series of sight-openings, *l n*, corresponding in number to the disks, and so positioned that as each disk is revolved the numbers in the row *k* will be successively brought into view through the opening *l*, and the numbers in the row *m* through the opening *n*, as shown in Fig. 1. Only a part of the numbers in the rows *k m* are shown in Fig. 2; but it is to be understood that said rows extend around the entire face of the disks, the rows *k*, as shown in the present case, including the numbers from 0 to 99, and the rows *m* the products of each of these numbers when multiplied, respectively, by the numbers representing the units upon which the computations are based. In the cases of those numbers in the rows *k* which consist of more than one figure the figures will preferably be arranged one above another, as shown, so that the reading will be from the top down instead of from left to right. In the rows *m* the figures constituting the numbers will preferably be arranged so as to read from left to right in the usual manner, as shown. The numbers in the rows *k m* will be arranged in such relation to each other and to the sight-openings *l n* that when any given number in the row *k* is exposed through the opening *l* the number representing the product of that number when multiplied by the unit upon which the computation is based will at the same time be exposed through the opening *n*.

It will be observed that the disks *a b c*, &c., are arranged so as to overlap each other. This is a feature of considerable importance, as by arranging the disks in this manner the number of the disks may be greatly increased, thus increasing the capacity of the apparatus without reducing the size of the disks or making the apparatus of an inconvenient size. It will also be observed that, in overlapping, the disks are so arranged that a portion of each disk comes next to each of the plates A B, and that this portion is the same in each disk. This permits the openings *l n* for each of the disks to be in the same position with relation to the knob *h*, which is also a feature of importance.

As illustrated in the present case, the apparatus is provided with six of the disks; but it is of course to be understood that the number may be increased or diminished according to the capacity which it is desired to give to the apparatus.

Above each of the disks *a b c*, &c., and in some convenient position with relation to the knob *h*, preferably between it and the sight-opening *l*, the plate A is provided with a number, *p*, representing the unit upon which the computations to be made upon that particular disk are based. If the apparatus is designed for use in computing wages, the numbers *p* will represent the rate of wages per hour or per day, or the sum per piece paid to the different classes of workmen in the establishment, while if the apparatus is designed for the use of salesmen or cashiers the numbers *p* will represent the price per yard or per pound, &c., of the different articles sold.

The manner of using the apparatus just described is as follows: It being assumed that the apparatus has been constructed so as to be adapted to compute wages at the rates paid in a certain factory, and that the pay-master upon looking at the pay-roll finds that a certain apprentice whose wages are six and one-quarter cents per hour is entitled to pay for sixteen hours, he then turns the knob *h* of the disk *a* until the number 16 is exposed through the opening *l*. By then glancing at the opening *n* he reads 100, and knows that the amount to be paid is one dollar. If the pay-roll shows that a workman whose wages are fifty-seven and one-half cents per hour is entitled to pay for twenty-two hours, he turns the knob of the disk *f* until the number 22 appears at the opening *l*, and then reads 1265 through the opening *n*, and knows that the sum to be paid is twelve dollars and sixty-five cents.

To aid in quickly bringing the proper number into position to be exposed through the opening *l*, each of the knobs *h* may be provided with a pointer, *s*, the end of which is arranged to move over a small scale, *r*, upon the plate A, as shown in connection with one of the knobs in Fig. 1. By this means the knob *h* can be quickly turned until the pointer *s* is near the point upon the scale *r* corresponding with the number in the row *k* which it is desired to expose, after which the knob will be turned slowly until the desired number comes into view, thus saving considerable time when the disk has to be moved a considerable distance to bring the proper number into position.

If it should be desired to increase the capacity of the apparatus without increasing the number of the disks, the opposite sides of the disks may be provided with rows of figures *t v* (see dotted lines in Fig. 2) corresponding to the rows *k m*, and the plate B with sight-openings *y z* and numbers *w*, corresponding to the openings *l n* and numbers *p*, so that by turning the apparatus over, so as to bring the plate B to the top, another series of computations can be made. This is also a feature of importance.

If it should be desired to give great capacity to the apparatus, a number of the single or double apparatuses such as just described may be hinged together, like the leaves of a book, and thus form an apparatus from which a great variety of multiplications can be made. When a number of the apparatuses are made into book form in this manner, the knobs *h* will preferably be dispensed with, so that the plates of the several apparatuses will lie closely together, and sockets provided in the studs *g*, into which a key can be inserted to turn the disks. When the knobs *h* are dispensed with in this manner, the plates A B will be held together by other suitable means.

Although, as before stated, it is preferable that the numbers in the rows *k t* should be arranged to read from the top down and the numbers in the rows *m v* from left to right, yet this arrangement of the numbers is not essential.

Although, as before stated, the apparatus is especially adapted for making computations involving the process of multiplication, yet it will be found useful for displaying many other classes of tables. For example, it may be arranged for use in computing interest. In such case the numbers *p* will represent the rate per cent., the numbers in the rows *k* the time in days, and the numbers in the rows *m* the amount of one dollar at the rate indicated by the numbers *p* for the different numbers of days indicated in the rows *k*; or the apparatus may be arranged for displaying the prices of the different parts of a machine. In such case the numbers *p w* will represent the character of the machine—*i. e.*, its size, &c.—the numbers in the rows *k t* the different parts, and the numbers in the rows *m v* the price; or, in fact, it may be so arranged as to display any table consisting of three factors.

In some cases where it is desired to make the apparatus especially strong and rigid, the studs *g* may be journaled in a thick base-plate, on one or both sides of which will be arranged a series of the disks, *a b c*, &c. In such case the face plate or plates can be made very light and thin.

What I claim is—

1. The herein-described calculating or displaying apparatus, composed of the series of revolving disks *a b c*, &c., arranged to overlap each other, as described, and provided with the concentric rows of numbers *k m*, bearing the described relation to each other, and the plate A, arranged to cover said disks and having the sight-openings *l n*, one for each row of numbers upon the disks, and provided with the numbers *p*, bearing the described relation to the numbers in the rows *k m*.

2. The herein-described calculating or displaying apparatus, composed of the series of revolving disks *a b c*, &c., arranged to overlap each other, as described, and provided upon their opposite sides with the concentric rows of numbers *k m* and *t v*, bearing the described relation to each other, and the plates A B, arranged upon opposite sides of said disks and having the sight-openings *l n* and *y z*, one for each row of numbers upon the disks, and provided with the numbers *p w*, bearing the described relation to the numbers in the rows *k m* and *t v*.

In testimony whereof I have hereunto set my hand in the presence of two subscribing witnesses.

FREDERICK W. CHILD.

Witnesses:
T. H. PALMER,
J. A. HOVEY.